Patented Mar. 8, 1938

2,110,472

UNITED STATES PATENT OFFICE 2,110,472

BISMUTH ALKYL PHTHALATES

George W. Raiziss and Le Roy W. Clemence, Philadelphia, Pa., assignors to Abbott Laboratories, North Chicago, Ill., a corporation of Illinois No Drawing. Application November 25, 1935, Serial No. 51,474

6 Claims. (Cl. 260—11)

We have discovered organic bismuth compounds produced from alkyl phthalates which have been found to be of high value as pharmaceuticals, more specifically as spirocheticides, and of special value in the treatment of syphilis. Said compounds are oil soluble, which is a most valuable property in pharmaceuticals in this field; they are also of low toxicity and of high therapeutic effect.

We have found that bismuth compounds of phthalates of aliphatic alcohols containing 8 e. g. octyl alcohol, or more carbon atoms are of special value for the purposes outlined above.

The following examples will illustrate our invention:

(1) *Bismuth derivative of mono-lauryl phthalate*

Mix 33.6 grams of mono-lauryl phthalate with 35 grams of bismuth oxide. About 25 cc. of water is added (enough to keep solids in suspension) and the mixture heated in a glass container for 8 hours in the water bath containing boiling water. Care is taken that the ingredients are thoroughly and continually mixed. From time to time a little more water is added to keep the volume constant, so that the solid material is always under water. The yellow color of bismuth oxide gradually disappears and at the end of the reaction a homogeneous colorless solid is obtained. Now the heating should be continued until all the water is evaporated. 25 cc. of benzene is added and evaporated off in order to carry off the moisture. This is done several times to remove the last traces of water. Finally the solid is dissolved as much as possible in hot benzene, filtered several times until the filtrate is clear. All of the benzene is permitted to evaporate and the remaining solid is dried thoroughly in a vacuum desiccator. The residue obtained is gummy and weighs about 57 grams. It is dissolved in 190 cc. of olive oil and 150 cc. of anhydrous ether. The solution is filtered and the ether distilled off by warming on a steam bath. All traces of ether must be removed. The above compound has the following graphic formula:

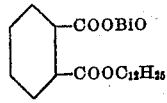

(2) *Mono-undecyl phthalate*

This method is practically the same except that 3.2 grams of mono-undecyl phthalate and 3.2 grams of $Bi_2O_3$ were mixed, a small quantity of water added and heated together on steam bath. This compound has the following graphic formula:

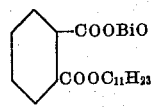

(3) *Monostearyl phthalate*

This method is the same as above except that 4.2 grams of monostearyl phthalate and 3.2 grams of $Bi_2O_3$ are mixed together—a small amount of water added and heated together on steam bath. This compound has the following graphic formula:

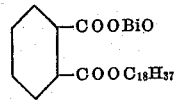

(4) *Bismuth derivative of mono decyl phthalate*

This method is the same as in monolauryl derivative using 3.06 grams of monodecyl phthalate and 3.2 grams bismuth oxide. Dissolve finally in ether and oil to concentration of 0.100 g./cc. of bismuth. On standing overnight oil solution precipitates. On diluting to concentration of 0.050 gm./cc. oil solution remains stable. This compound has the following graphic formula:

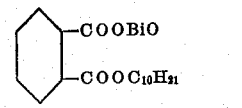

(5) *Bismuth derivative of mono cetyl phthalate*

This method is the same as in monolauryl derivative, using 3.9 grams of monocetyl phthalate and 3.2 grams of bismuth oxide. This compound has the following graphic formula:

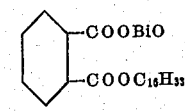

We claim as our invention:
1. A compound having the formula:

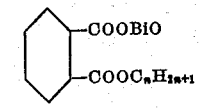

wherein $n$ is 8 to 18 inclusive.

2. Bismuth lauryl phthalate having the formula:

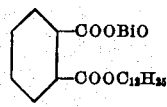

3. Bismuth mono-cetyl phthalate having the formula:

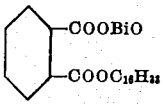

4. Bismuth mono-decyl phthalate having the formula

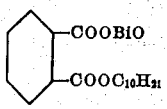

5. A method of producing a compound of the class described, comprising heating together at approximately boiling temperature of water, in aqueous suspension, a mono-alkyl phthalate, of which the alkyl group has 8 to 18 carbon atoms, and bismuth oxide, until a substantially homogeneous and colorless solid is produced having the formula:

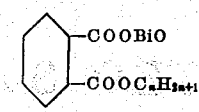

wherein $n$ represents the number of carbon atoms in the alkyl group and $2n+1$ represents the number of hydrogen atoms in the alkyl group.

6. A compound having the formula:

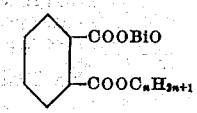

wherein $n$ is 10 to 18.

GEORGE W. RAIZISS.
LE ROY W. CLEMENCE.